(12) United States Patent
Niekrewicz et al.

(10) Patent No.: US 8,819,460 B2
(45) Date of Patent: Aug. 26, 2014

(54) DYNAMIC ENERGY MANAGEMENT

(71) Applicant: International Business Machines Corporation, Armonk, NY (US)

(72) Inventors: Paul Niekrewicz, Essex Junction, VT (US); Pascal A. Nsame, Colchester, VT (US); Aydin Suren, Essex Junction, VT (US); Sebastian Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/961,926

(22) Filed: Aug. 8, 2013

(65) Prior Publication Data
US 2013/0326245 A1 Dec. 5, 2013

Related U.S. Application Data

(62) Division of application No. 12/641,578, filed on Dec. 18, 2009, now Pat. No. 8,549,330.

(51) Int. Cl.
*G01F 1/26* (2006.01)

(52) U.S. Cl.
USPC .......... 713/300; 713/1; 713/2; 713/310; 713/320; 713/321; 713/323; 713/324; 713/330; 713/340; 725/23

(58) Field of Classification Search
USPC ......... 713/1, 2, 300, 310, 320–324, 330, 340; 725/323
See application file for complete search history.

(56) References Cited

U.S. PATENT DOCUMENTS

| | | | |
|---|---|---|---|
| 6,625,740 B1 | 9/2003 | Datar | |
| 6,834,354 B1 | 12/2004 | Togawa | |
| 7,197,652 B2 | 3/2007 | Keller, Jr. et al. | |
| 7,287,173 B2 | 10/2007 | Hsieh | |
| 7,620,832 B2 | 11/2009 | Kissell | |
| 7,673,158 B2 | 3/2010 | Dang et al. | |
| 7,930,578 B2 * | 4/2011 | Bose et al. | 713/340 |
| 2003/0079150 A1 * | 4/2003 | Smith et al. | 713/320 |
| 2006/0095807 A1 * | 5/2006 | Grochowski et al. | 713/324 |
| 2007/0288782 A1 | 12/2007 | Chang et al. | |
| 2008/0133948 A1 | 6/2008 | Byun et al. | |
| 2008/0178026 A1 | 7/2008 | Chen | |
| 2008/0201591 A1 | 8/2008 | Hu et al. | |

FOREIGN PATENT DOCUMENTS

WO 2006034322 A2 3/2006

OTHER PUBLICATIONS

Anonymous, Method for dynamic power efficiency via power-partitioned register files in simultaneous multithreaded architectures, PriorArtDatabase, ip.com., Jan. 2005, 5 pages.
Lee et al., Throttling-Based Resource Managment in High Performance Multithreaded Architectures, IEEE Transactions on Computers, IEEE Computer Society, vol. 55, No. 9, Sep. 2006, pp. 1142-1152.

* cited by examiner

*Primary Examiner* — M Elamin
(74) *Attorney, Agent, or Firm* — Cantor Colburn LLP; Michael LeStrange

(57) ABSTRACT

A method of dynamic energy management that includes loading an energy budget configuration stream for an instruction of a thread, loading characterization data for the thread, computing energy management settings for the instruction based on the characterization data and the budget configuration stream, and driving control signals indicative of the computed energy management settings.

8 Claims, 7 Drawing Sheets

DYNAMIC ENERGY MANAGEMENT

CROSS REFERENCE TO RELATED APPLICATIONS

This application is a divisional of U.S. patent application Ser. No. 12/641,578, filed Dec. 18, 2009, now U.S. Pat. No. 8,549,330, the disclosure of which is incorporated by reference herein in its entirety.

FIELD

This application relates to energy management, and in particular, to systems and methods of reliable dynamic energy management.

BACKGROUND

Conventional computer systems rely on voltage and frequency scaling based upon the performance level of the system of available battery power for energy management. Typically, a temperature or remaining power calculation is performed. Subsequently, in response to a power budget, a scaling down of voltage or frequency shifting will occur to lower overall power performance of the system. Furthermore, within computer processors of conventional systems core power saving techniques have included clock gating or voltage isolation/shutdown for units not needed.

SUMMARY

An example embodiment includes a computer system with reliable dynamic energy management. The computer system includes a thread synchronized energy configurator, the thread synchronized energy configurator extends an instruction decoder of the computer system and the thread synchronized energy configurator is disposed to append an energy configuration field including energy configuration bits to pipeline control bits of instructions in the instruction decoder. The computer system further includes a thread synchronized dynamic frequency shifter (DFS), the thread synchronized DFS is disposed to set control signals indicative of a frequency shift both per thread and per pipeline. The computer system further includes a thread synchronized general purpose register (GPR) super scaler, the GPR super scaler is disposed to optimize thread operation based upon the set control signals.

Another example embodiment includes a method of dynamic energy management. The method includes loading an energy budget configuration stream for an instruction of a thread, loading characterization data for the thread, computing energy management settings for the instruction based on the characterization data and the budget configuration stream, and driving control signals indicative of the computed energy management settings.

Another example embodiment includes a computer readable storage medium including computer executable instructions that, when executed on a computer processor, direct the computer processor to perform a method of dynamic energy management. The method includes processing all instructions available to the computer processor independently, measuring power consumption information of each instruction, storing the power consumption information of each instruction as an energy budget, loading an energy budget configuration stream for an instruction of a thread, loading characterization data for the thread, computing energy management settings for the instruction based on the characterization data and the budget configuration stream, and driving control signals indicative of the computed energy management settings.

DETAILED DESCRIPTION

Figure 1:
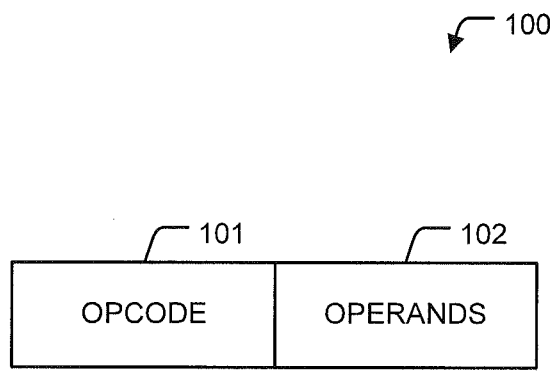
FIG. 1 illustrates a conventional computer instruction.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

Example embodiments of the present invention provide computer processors with an extended instruction decoder such that along with pipeline control bits of conventional systems, an energy configuration field is created and processed on a per instruction decode basis. The instruction decoder considers both the current instruction and the N-pipeline depth. Based upon a pre-validated cycle and performance requirement for a particular instruction type, order, and synchronization time of the per instruction basis, a per-pipeline stage for each instruction thread is set for both the frequency of the unit and potentially the voltage of the computer processor.

Furthermore, dynamic frequency shifting (DFS) may be applied to micro-units of the computer processor such that the per thread, per pipeline stage may include dynamic frequency shifts on a per cycle basis.

Due to a variety of thread combinations, it follows that a decode is not based upon a single decode of a per thread basis, but rather a decode should take into consideration each thread's interdependency if such exists.

Furthermore, within a single thread, a super scaler may produce a pseudo-multi-thread effect. Thus, as the real-time super scaler out of order engine is operating, the superscalar may move lower priority portions of an instruction stream to a lower DFS boundary. It follows that the clock rate is dependent upon the super scaler parsing and time scheduling of the synchronization. Therefore, instead of forcing faster threads into temporary registers to wait for slower functions, sub-threads that are synched later may simply be clock shifted lower, such that slower functions finish within a correct sync period. Thus, example embodiments will potentially reduce the amount of scratch register use and extra overhead.

As outlined below, conventional computer instructions and pipelines do not provide adequate control fields or processing ability which may be used through an extended energy configurator.

FIG. 1 illustrates a conventional computer instruction 100. For example, both reduced instruction set and complex instruction set computers (i.e., RISC and CISC) typically have instructions consisting essentially of an opcode portion 101 and operand portion 102. The opcode portion 101 may include an operation to be performed and the operand portion 102 includes a quantity on which the operand is performed. Generally, the computer instruction 100 may be pipelined within a computer processor along with other pending instructions.

Figure 2:
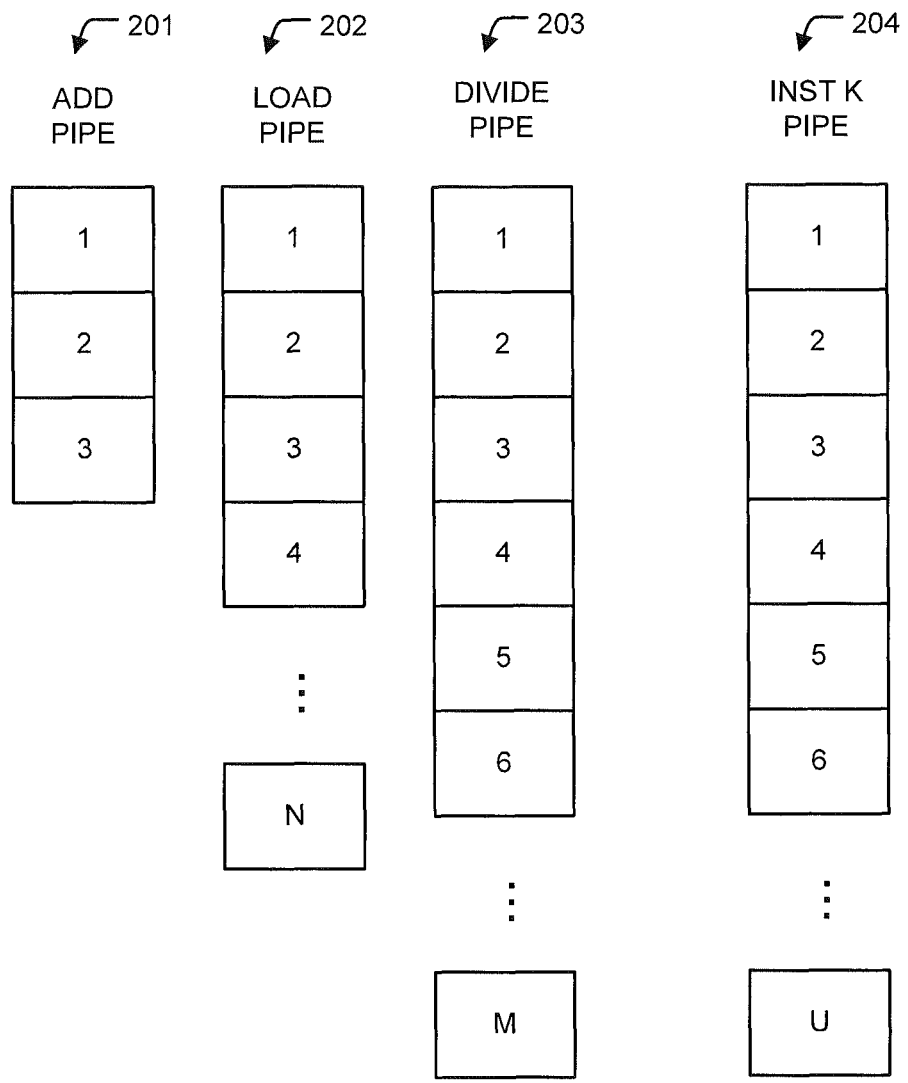
FIG. 2 illustrates conventional computer processor pipelines.

FIG. 2 illustrates conventional computer processor pipelines. For example, a conventional computer processor may include an addition pipeline 201, a load pipeline 202, a divide pipeline 203, and/or other instruction (i.e., instruction k) pipeline 204. Each pipeline may be divided into stages based upon any particular processor design. Furthermore, each of these pipelines may utilize a processor core clock (not illustrated) for synchronization.

According to example embodiments, however, extensions to conventional computer instructions and pipelines are provided which enable efficient and reliable dynamic energy management.

Figure 3:
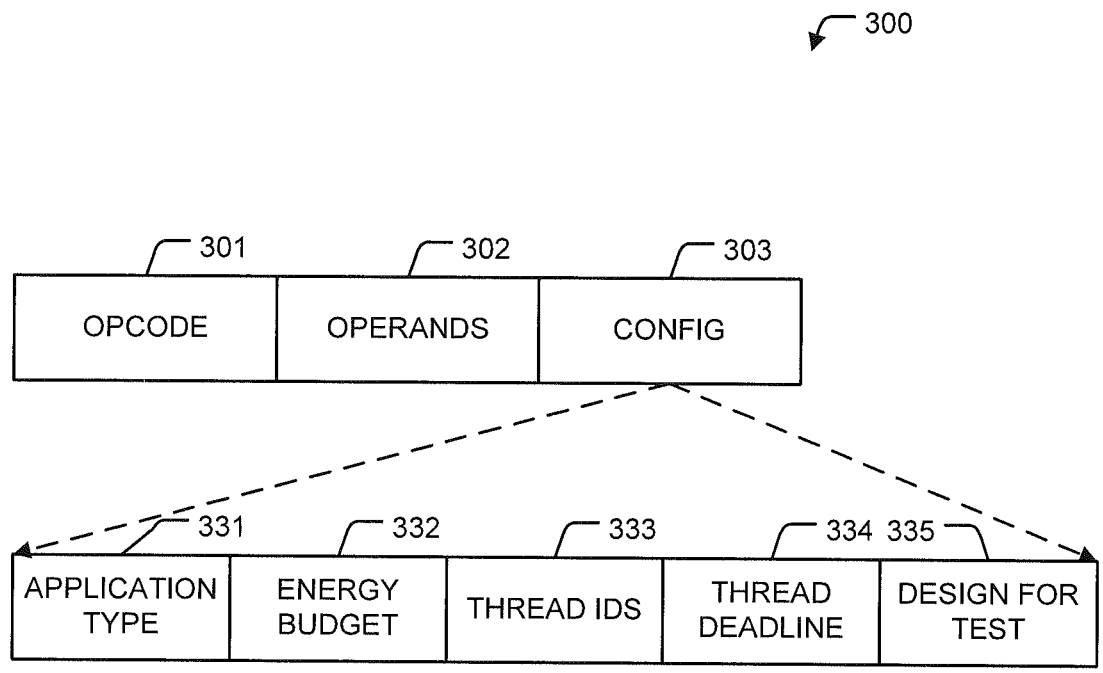
FIG. 3 illustrates an extended computer instruction, according to an example embodiment.

FIG. 3 illustrates an extended computer instruction, according to an example embodiment. As illustrated, instruction 300 includes an opcode portion 301, an operand portion 302, and a configuration portion 303. The opcode portion 301 and operand portion 302 may be somewhat similar to portions 101 and 102 discussed above.

The configuration portion 303 is an extended instruction portion including information for dynamic energy management, according to an example embodiment. The configuration portion 303 may include fields directed to an application type (331), an energy budget (332), thread identification (333), thread deadline (334), and/or test identification (335).

The application type field 331 may include a quantity or number designating a type of application to which the instruction pertains to. For example, the application may be a computationally intensive application, a data dominated application, a control dominated application, and/or a rate constrained application. It is noted however, that there may be more or less application types included in any given implementation and thus example embodiments should not be limited only to these illustrative examples. Depending upon a given application type, energy management of a computer executing the instruction may direct the computer to adjust power consumption.

The energy budget field 332 may include a quantity or number designating a type or form of energy budget for the instruction. For example, an energy budget may be divided into any number of levels or types of energy constraints. According to one example embodiment, an energy budget may include a minimum energy usage designation, a nominal energy usage designation, and a maximum energy usage designation. Depending upon the energy budget level identified in the energy budget field 332, energy management of a computer executing the instruction may direct the computer to adjust power consumption over time per thread and per pipeline.

An energy budget may be determined prior to system deployment such that an energy budget for each available instruction is available for the energy budget field 332. For example, each available instruction may be processed in a testing environment or testing routine such that power consumption over one time period is determined. The power consumption may be measured through change in effective capacitance (i.e. FO4) correlated to characterization data and other processor energy values over an instruction's time period. Thereafter, each actual energy budget for each available instruction may be stored for use and insertion into energy budget field 332 of each instruction.

The thread identification field 333 may include an identification number of a type or form of thread to which the instruction pertains to. For example, threads may be divided into a hierarchy or master-slave relationship. Thus, the thread identification field may denote the type of thread. Depending upon the type of thread identified in the thread identification field 333, energy management unit of the computer executing the instruction may direct the computer to adjust power consumption over time.

The thread deadline field 334 may include a quantity or number designating a deadline for execution of a thread to which the instruction pertains to. For example, a thread may have a minimal, nominal, or maximum deadline. Thus, depending upon the deadline identified within the thread deadline field 334, energy management of the computer executing the instruction may direct the computer to adjust power consumption over time such that the deadline is met with minimal actual energy usage.

The extended computer instruction 300 may be pipelined in a computer processor, alongside other instructions for execution within the computer processor.

Figure 4:
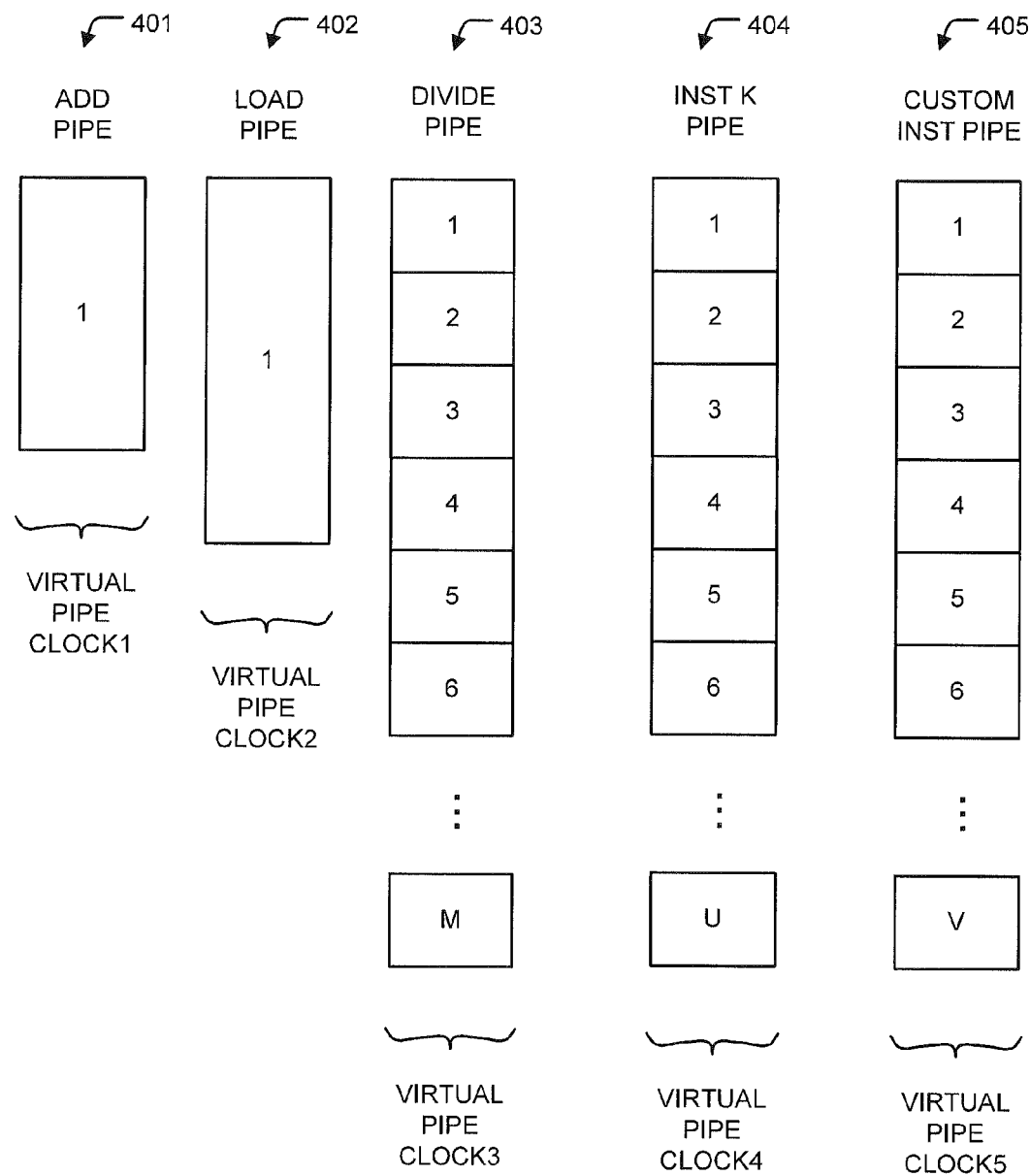
FIG. 4 illustrates pipelines of computer processors with dynamic energy management, according to an example embodiment.

FIG. 4 illustrates pipelines of computer processors with dynamic energy management, according to an example embodiment. According to example embodiments, pipelines and virtual pipelines may be implemented. As illustrated in FIG. 4, pipelines 401-405 are example implementations of instruction pipelines including an addition pipeline, load pipeline, divide pipeline, other instruction (i.e., instruction k) pipeline, and/or custom instruction pipeline. Each pipeline 401-405 may utilize a dedicated virtual pipe clock (i.e., Clock1-Clock5) for synchronization purposes, thereby allowing frequency control on a per pipeline basis and thread basis.

Hereinafter, a more detailed description of methods of dynamic energy management including the extended computer instructions and pipelines described above is provided with reference to FIG. 5.

Figure 5:
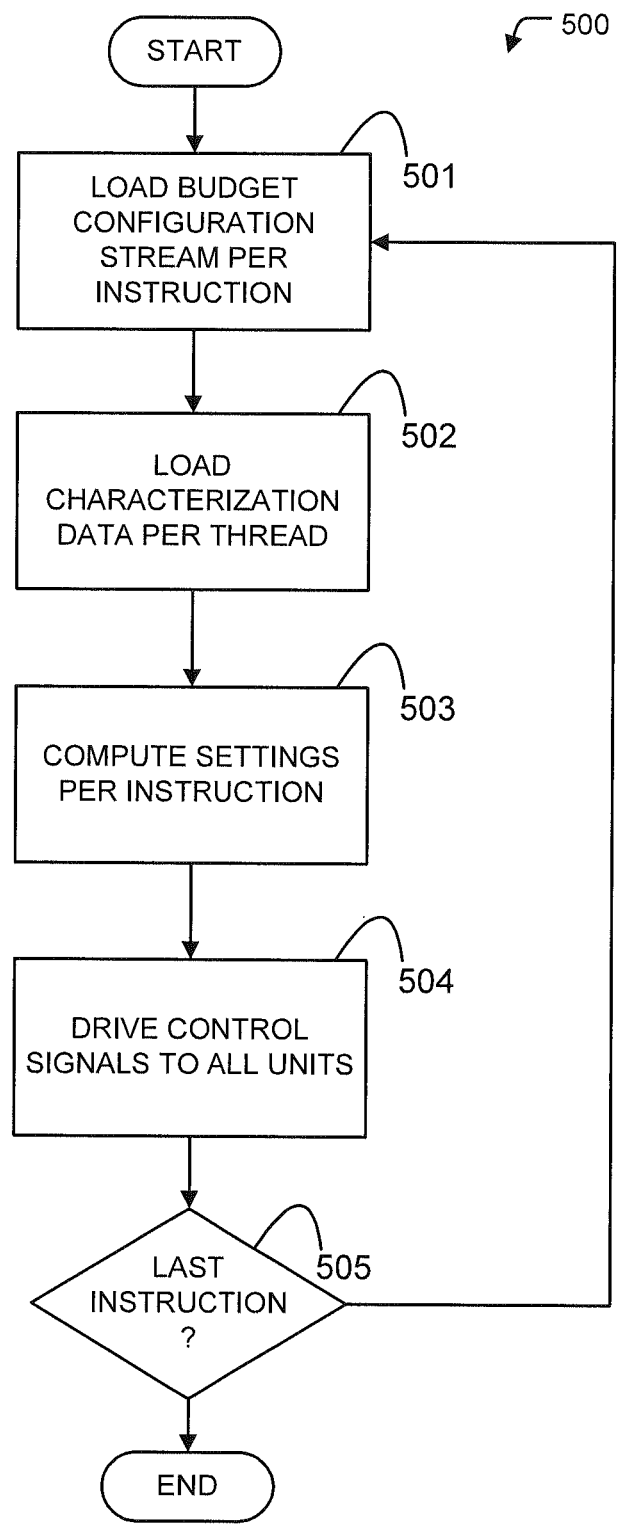
FIG. 5 illustrates a method of dynamic energy management, according to an example embodiment.

FIG. 5 illustrates a method of dynamic energy management, according to an example embodiment. The method 500 includes loading a budget configuration stream per instruction at block 501. As described above, the budget configuration stream includes bits for an extended computer instruction. The budget configuration is determined through an energy budget routine which takes into consideration the range of actual power consumption of each available instruction over time. For example, each available instruction is processed in a test and calibration routine. The power consumption for each available instruction is measured and stored for future use, for example, in a table located in a non-volatile memory or storage unit. The information stored may be accessed at instruction runtime if energy budget configuration information is needed.

Thus, loading a budget configuration stream for each instruction includes determining a type of instruction, retrieving energy budget configuration information for the type of instruction, and inserting the energy budget configuration for the type of instruction prior to executing the type of instruction.

The method 500 further includes loading characterization data per thread at block 502. The characterization data includes both cycle and performance requirements for an instruction type. For example, cycle and performance requirements may be calculated based upon the environmental requirements for a processor implementing the method 500.

More clearly, ambient temperature plays a role in the reliability of instruction computation, system health, and system longevity. If a particular processor is situated in an environment with a particular temperature profile (e.g., cold weather, outdoor environment, hot weather, etc), the temperature profile may be taken into consideration alongside power consumption for each instruction (described above) such that the operating temperature of the processor stays within a programmable range that is dynamically adapted for that specific computer in that specific environment during a specific thread execution session.

An adapted nominal range for a processor may be a temperature range at which a processor performs reliably for a given energy budget. The maximum range may be a predetermined or desired range determined by an end-user or third party, a manufacturer of the processor, or any other suitable entity. The actual temperature of the processor may be measured on chip through available temperature sensors on the processor. Thus, the adapted nominal temperature range of the processor, the power consumption of an instruction over time, and the depth of a current pipeline may be dynamically adjusted such that a thread is executed at runtime with minimal temperature cycling. More clearly, power dissipation over time (i.e., over a time necessary to perform an instruction) may be used to derive temperature increase and frequency. Therefore, the characterization data includes information necessary to provide energy management profile information to be used in dynamic energy budget management for a particular thread within a reliable window of operation.

The method 500 further includes computing settings per instruction at block 503. The settings of each instruction are based upon the loaded budget configuration and the load characterization of an instruction's thread as established in blocks 501-502. The settings may include the frequency and voltage requirements of each per thread, per pipeline stage of the processor.

Thereafter, the method 500 includes driving control signals indicative of the computed settings to all units of the processor at block 504. The control signals are signals derived from the frequency and voltage requirements established in blocks 501-503, and provide energy management on a thread-by-thread basis. The method 500 repeats for all pending instructions.

Hereinafter, dynamic energy management is described more fully with reference to computer processor architecture including provisions for extended computer instructions as described above.

Figure 6:
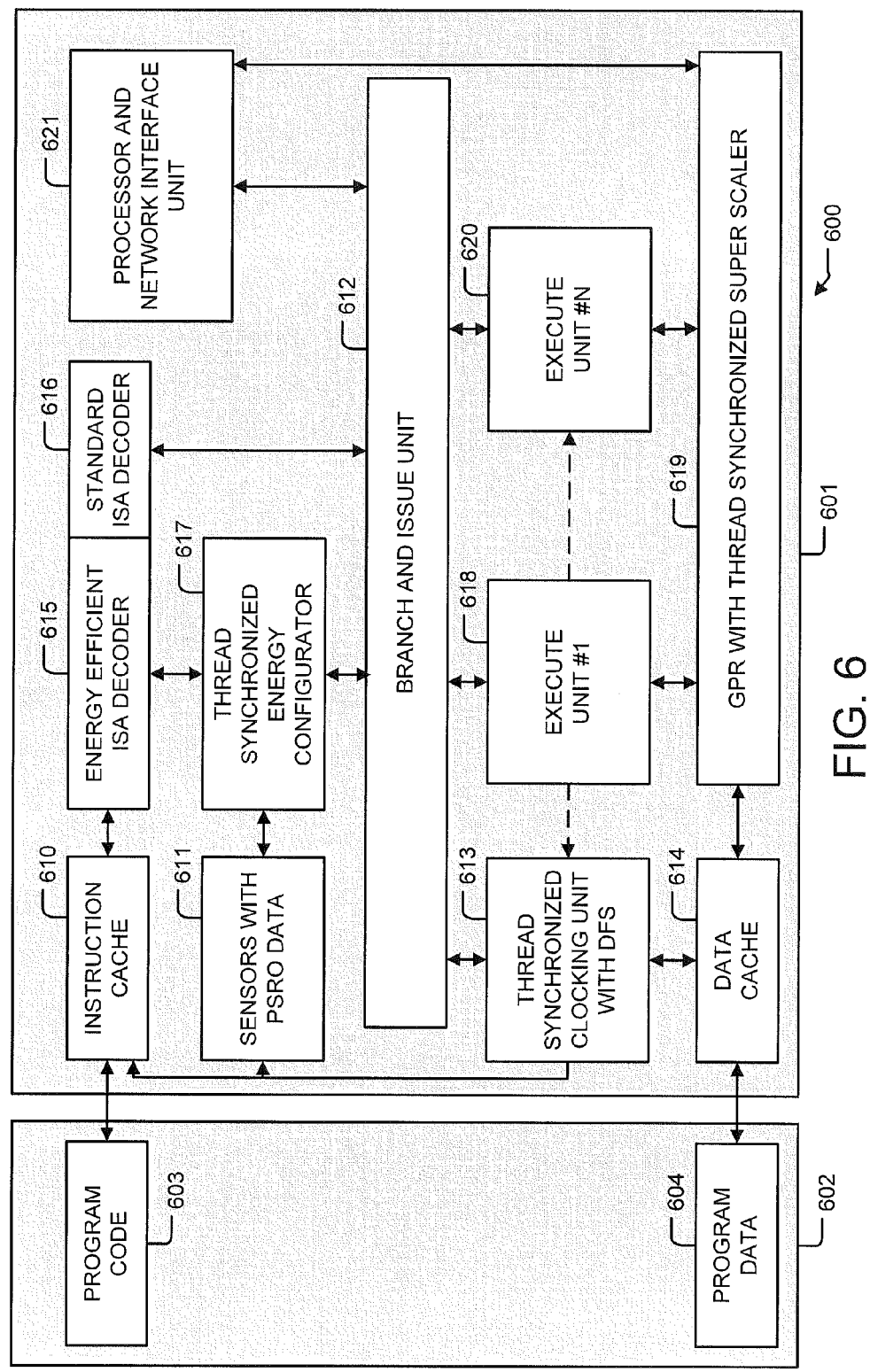
FIG. 6 illustrates a computer system with dynamic energy management, according to an example embodiment.

FIG. 6 illustrates a computer system with dynamic energy management, according to an example embodiment. The computer system 600 includes a processor 601 and a memory 602. The memory 602 includes program code 603 and program data 604. For example, the program code 602 and program data 603 may be instruction information of any conventional type, including stored energy budget configurations for available instructions. The memory 602 is in communication with the processor 601.

The processor 601 includes instruction cache 610 and data cache 614 in communication with the program code 603 and program data 604, respectively.

The processor 601 further includes an instruction set architecture (ISA) decoder which further includes an energy efficient ISA decoder 615 and a standard ISA decoder 616, in communication with the instruction cache 610.

The processor 601 further includes a thread synchronized energy configurator 617 in communication with the energy efficient ISA decoder 615. For example the energy configurator 617 is disposed to extend the ISA decoder 615 and is disposed to append an energy configuration field (i.e., bits) to pipeline control bits of instructions of the instruction decoder 615. These energy configuration field bits are described in detail above with reference to FIGS. 1-4.

The processor 601 further includes voltage and temperature sensors 611 in communication with the energy configurator 617. The temperature and voltage sensors provide temperature and voltage information for computation of characterization settings of each instruction.

The processor 601 further includes branch and issue unit 612 in communication with the energy configurator 617, the standard ISA decoder 616, and a processor and network interface 621. The branch and issue unit 612 may be branch processing unit capable of processing pipelined instructions in a superscalar processor (i.e., processor 601).

Turning back to the data portion of the processor 601, the processor 601 may further include a thread synchronized clocking unit 613 in communication with the data cache 614 and the branch and issue unit 612. The clocking unit 613 may further be in communication with the instruction cache 610 and the sensors 611. The clocking unit 613 may be a thread synchronized clocking unit with a dynamic frequency shifter (DFS).

The processor 601 further includes a general purpose register (GPR) with a thread synchronized super scalar 619 in communication with the data cache. The GPR is disposed to optimize thread operation based upon a set control signals (described above).

The processor 601 further includes a plurality of execution units 618-620 (i.e., 1, 2, . . . , N) in communication with the GPR 619, the clocking unit 613, and the branch and issue unit 612.

Through the use of the sensor data provided by sensors 611 and the energy configurator 617, in addition to the (DFS) of the clocking unit 613, voltage and frequency may be controlled on a thread-by-thread basis. It follows that two pipelines of a conventional processor may be substantially similar due to conventional system architecture. However, this is not the case in the super scalar (GPR) outlined in FIG. 6. These pipelines may be operated independently by thread due to the thread-synchronized nature of the GPR 619. Thus, through energy management based on individual instructions which provide data on adapted energy usage for threads, a dynamic management scheme using frequency shifts and voltage shifts for individual concurrent pipelines is provided which may improve reliable instruction computation. Furthermore, this scheme may increase system longevity through consideration of environmental variables such as thread adapted temperature ranges, which may be used in determining energy control bits described above.

It is also noted that although the range of power dissipation characteristics for each available instruction have been described as being pre-determined before computation time, any alternate form of per-instruction power dissipation may be equally applicable. For example, a set of alternate dissipation characteristics may be stored, with each alternate representing a different actual processor temperature or temperature range. For example, as the processor temperature increases, power dissipation characteristics of the processor may also change. Thus, alternative power dissipation values for each instruction may be applicable. Also, as the ambient or environmental temperature variables change, a different energy management scheme may be suitable. Therefore, the stored power dissipation values may be changed throughout processor operation and not stay fixed for the life-cycle of any processor. It follows therefore, that although an illustrative example of power dissipation calculations and energy configuration is described herein, all alternates and application implementations should not be excluded, but rather should fall within the scope of example embodiments.

Figure 7:
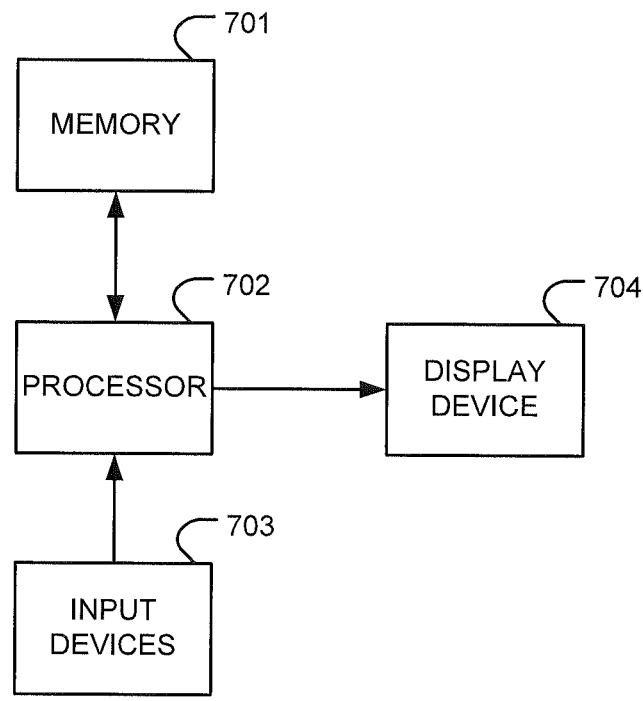
FIG. 7 is a high-level diagram of a computer apparatus, according to an example embodiment.

Additionally, the methodologies and systems of example embodiments of the present invention may be implemented in hardware, software, firmware, or a combination thereof. For example, according to an exemplary embodiment, the methodologies described hereinbefore may be implemented by a computer system or apparatus. For example, FIG. 7 is a high-level diagram of a computer apparatus, according to an example embodiment. Therefore, portions or the entirety of the methodologies described herein may be executed as instructions in a processor 702 of the computer system 700. The computer system 700 includes memory 701 for storage of instructions and information, input device(s) 703 for computer communication, and display/output device 704. Thus, the present invention may be implemented, in software, for example, as any suitable computer program on a computer system somewhat similar to computer system 700. For example, a program in accordance with the present invention may be a computer program product causing a computer to execute the example methods described herein.

The computer program product may include a computer-readable storage medium having computer program logic or code portions embodied thereon for enabling a processor (e.g., 702) of a computer apparatus (e.g., 700) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks, cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method of dynamic energy management, comprising:
    loading, by a processor, an energy budget configuration stream for an instruction of a thread, the energy budget configuration stream including bits for an extended computer instruction representing power dissipation characteristics of the instruction;
    loading, by the processor, characterization data for the thread;
    computing, by the processor, energy management settings for the instruction based on the characterization data and the budget configuration stream; and
    driving control signals indicative of the computed energy management settings.

2. The method of claim 1, further comprising processing all instructions available independently of one another, measuring and storing actual energy used per thread and per pipeline during processing.

3. The method of claim 2, wherein the energy budget configuration stream further includes the power consumption information for the instruction over time.

4. The method of claim 1, wherein loading the budget configuration stream for each instruction includes determining a type of instruction for the instruction, retrieving energy budget configuration information for the type of instruction, and inserting the energy budget configuration for the type of instruction.

5. The method of claim 1, wherein loading characterization data per thread includes retrieving cycle and performance requirements for a type of instruction, the cycle and performance requirements being calculated based upon the environmental requirements for a processor.

6. The method of claim 5, wherein the environmental requirements include the actual average ambient temperature of the processor, a target reliability grade of the processor, a target system health of the processor including a rate of error conditions occurring per thread and per pipeline.

7. The method of claim 1, wherein the energy management setting for the instruction include the frequency and voltage requirements of the thread on a per pipeline, per thread basis.

8. A non-transitory machine-readable storage medium including computer executable instructions that, when executed on a computer processor, direct the computer processor to perform a method of dynamic energy management, the method comprising:
   processing all instructions available to the computer processor independently;
   measuring actual energy usage of each thread;
   storing the energy usage information of each thread as an energy budget;
   loading an energy budget configuration stream for each thread, the energy budget configuration stream including bits for an extended computer instruction representing power dissipation characteristics of the thread;
   loading characterization data for the thread;
   computing energy management settings for the instruction based on the characterization data and the budget configuration stream; and
   driving control signals indicative of the computed energy management settings.

* * * * *